June 24, 1958 — J. E. TOLLAR ET AL — 2,840,397
POSITIONING MEANS
Filed Feb. 20, 1956
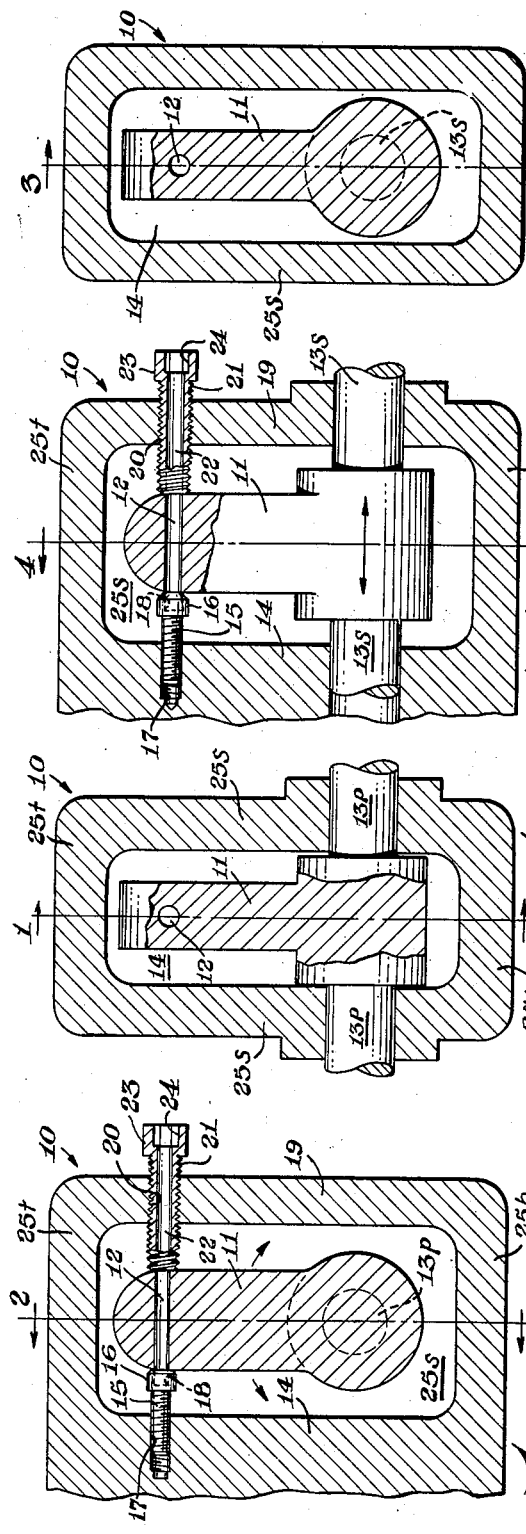
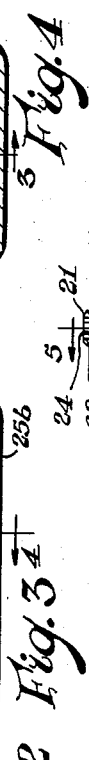
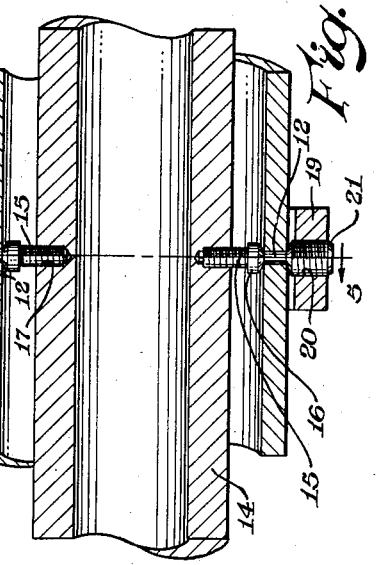
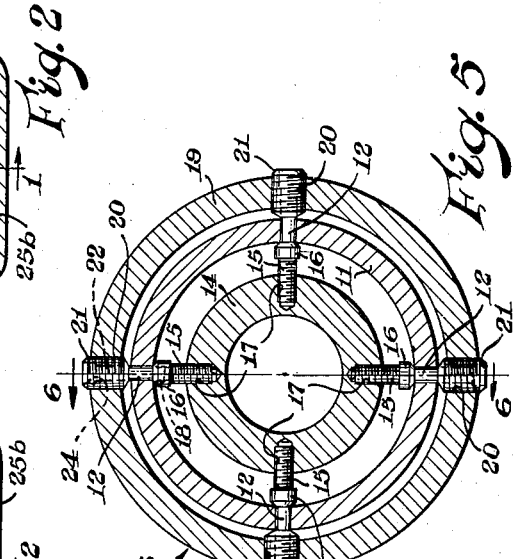
INVENTORS.
James E. Tollar
Murrey O. Longstreth
BY Griswold & Burdick
ATTORNEYS United States Patent Office 2,840,397
Patented June 24, 1958

2,840,397
POSITIONING MEANS

James E. Tollar and Murrey O. Longstreth, Midland, Mich., assignors to The Dow Chemical Company, Midland, Mich., a corporation of Delaware Application February 20, 1956, Serial No. 566,529

6 Claims. (Cl. 287—14)

This invention has reference to a means particularly adapted for the blind positioning and adjustment of internally located movable parts and members which have a limited accessibility.

The functionality of many mechanisms and apparatus may frequently be restricted and their design and construction rendered difficult or even incapable of accomplishment when they have internal movable parts that require translational adjustment and positive situation but which are physically accessless or relatively inaccessible excepting from a single side or general direction. The incorporation of a slidable, pivotable or otherwise movable element or body requiring rigid, positive and close positioning or adjustment between partitions, walls or other enclosing or encompassing members may thus be precluded from various devices, contrivances and appliances if there is only unidirectional access to the movable element through one of the enclosures and it is impractical or undesirable to make positive coupling or mechanical linkage with an actuator extending from one side of the part.

It is among the principal objects of the present invention to provide a means for possibilitating or implementing the adjustive design and arrangement of concealed or enclosed internally movable parts and elements having such circumscribing characteristics.

According to the invention, a positioning and adjusting means for an internal movable part located in an assembly between and facing an inner inaccessible enclosing member on one side and an outer enclosing member on its opposite side is comprised of an aperture in said movable part disposed in a direction between said inner and outer enclosing members; a screw, threaded into said inner enclosing member, contacting the side of said movable part facing said inner enclosing member with the head of said screw being engageable through said aperture; and a hollow screw, threaded through said outer enclosing member, contacting the opposite side of said movable part against and in communication with said aperture.

Further features and advantages of the positioning means of the invention will be apparent in the following description and the drawing, in which, in so far as possible, like reference numerals refer to like or equivalent parts, which illustrates several embodiments of the invention, wherein:

Figure 1 is a fragmentary cross-sectional side elevation of a positioning means for a pivotally movable part, taken along the line 1—1 in Figure 2 of an assembly;

Figure 2 is a front elevation, in cross-section along the line 2—2 in Figure 1, of the same pivotally movable part in the assembly;

Figure 3 is a cross-sectional side elevation of a positioning means for a slidable movable part, taken along the line 3—3 in Figure 4 of a similar assembly;

Figure 4 is a front elevation, in cross-section along the line 4—4 in Figure 3, of the same pivotally movable part in the assembly;

Figure 5 is a sectional plan view of a concentric positioning means for an internal movable part, taken along 5—5 in Figure 6 of another assembly; and Figure 6 is a fragmentary cross sectional elevation of the concentrically positionable part taken along 6—6 in Figure 5.

Referring initially to Figures 1 and 2, there is shown an assembly, indicated generally by the reference numeral 10, having an adjustable part 11 positioned internally within a housing, for example, or other enclosure, comprised of an inner inaccessible enclosing member or wall 14, an outer enclosing member or wall 19, side walls 25S and a top and bottom 25T and 25B, respectively. The movable part 11 is pivotally (or rotationally) mounted in the assembly 10 about a shaft 13P which is journaled in the side walls 25S to permit the part 11 to be moved in a frontward and backward direction between the enclosing members 14 and 19, as indicated by the bidirectional arrow in Figure 1. An aperture 12 in the movable part 11 is disposed to provide a path therethrough between the inner and outer enclosing members 14, 19.

An inner setscrew or adjusting screw 15 is threaded into a tapped aperture 17 in the inner enclosing member 14. The screw 15 contacts the inner face of the movable part 11 against the aperture 12 by the screw head 16. A socket 18 or equivalent means is advantageously provided in the screw head 16 to permit the screw to be turned by a suitable instrument inserted through the aperture 12. A hollow outer setscrew or adjusting screw 21, having a central passageway 22, is threaded in a tapped aperture 20 which extends through the outer enclosing member 19. The outer screw 21, which advantageously has a greater external diameter than the aperture 12, contacts the movable part 11 about the aperture 12 with the passageway 22 in communication with the aperture to allow the instrument for turning the inner screw 15 to be admitted from the accessible side of the assembly 10 through the outer enclosing member 19. The outer screw 21 may have a suitable head 23 and may be provided with a socket 24 in the head for turning purposes.

As is apparent, the movable part 11 may be positively adjusted and rigidly positioned with a fine degree of precision by adjustment of the contacting inner and outer screws 15 and 21; the former being adjustable through the accessway provided through the passageway 22 in the hollow outer screw 21 and the aperture 12 in the part 11 leading to the engaging means provided in, on or by the head 16 of the inner screw 15. The positioning means obviates the necessity for using springs or other resilient thrust means between the inaccessible inner enclosing member and the movable part and secures a type of firm and rigid situating and adjusting facility that otherwise is not readily attainable for the same purpose under the same conditions and circumstances.

A similar assembly 10 is depicted in Figures 3 and 4 with the movable part 11 being slidably adjustable to the front and rear (as shown by the bidirectional arrow in Figure 3) and mounted for linear movement in this manner on the slide rod 13S which extends through the inner and outer enclosing members 14 and 19 to facilitate this arrangement.

A plurality of positioning means may frequently be employed with advantage in an apparatus and other types of positioning may also be accomplished by the means provided for in accordance with the invention. By way of illustration, the assembly which is indicated generally by the reference numeral 26 in Figures 5 and 6 has a concentrically positionable annular movable part 11 incorporated therein. The four sets of inner and hollow (and, in this instance, headless) adjusting screws 15 and 21, respectively, are evenly spaced in the assembly. They are appropriately threaded into the stationary, inaccessible inner circular enclosing member 14 and through the rigid outer cylindrical enclosing member 19. The annular movable part 11, provided with four accommodating apertures 12 between the four sets of screws, is concentrically positionable by adjustment of the screws to any desired arrangement of the part between the inner and outer enclosing members 14, 19.

It is desirable for the adjusting screws and for the aperture through the movable part to be substantially perpendicular to the enclosing members. The inner screw 15 may conveniently be provided with a socket or slotted head so as to be centrally driveable. This facilitates movement of the screw by an instrument through the aperture 12 when the part 11 is contacted by the outer circumferential portion of the screw head 16. However, as is apparent, the screw head 16 may be arranged to extend into the aperture 12, if the screw 15 is provided with a shoulder or other means for contacting the side of the movable part 11. The screws employed may be threaded in any manner best adapted for the purposes at hand. Thus worms or very coarse threads may be utilized for heavy duty applications or precision or micrometer threads may be provided when a very precise and accurate positioning means is desired.

The positioning means of the present invention facilitates positive and close positioning of internal movable or adjustable members to be made. Its advantageous employment in various situations and for various purposes will be apparent and recognizable to those skilled in the art. One such application of the positioning means has advantageously been made in the Adjustable Extrusion Die disclosed by Murrey O. Longstreth and James E. Tollar in their copending application having Serial No. 561,475 which was filed on January 26, 1956.

Certain obvious changes and modifications in the positioning means can readily be entered into and devised in the practice of the present invention. Therefore, it is to be fully understood that the invention is not intended to be limited to or restricted by the several illustrative embodiments which constitute part of the foregoing description and specification. Rather, the invention is to be interpreted and liberally construed in the light of what is set forth and defined in the hereto appended claims.

What is claimed is:

1. In an assembly wherein an internal movable part is located between an inner inaccessible member on one side of said movable part and an outer wall member on the accessible side of said movable part, said movable part having an aperture disposed therein in a direction between said inner inaccessible member and said outer wall member; positioning and adjusting means for said internal movable part comprising a screw, threaded into said inner inaccessible member, contacting the side of said movable part facing said inner member with the head of said screw being engageable through said aperture; and a hollow outer screw threaded through said outer wall member, contacting the accessible outer side of said movable part against and in communication with said aperture.

2. The assembly of claim 1 wherein the hollow outer screw has a greater external diameter than the diameter of the aperture in said movable part.

3. The assembly of claim 1 and including means in combination with said movable part for adapting said part to be moved in a pivotal manner.

4. The assembly of claim 1 and including means in combination with said movable part for adapting said part to be moved in a linear manner.

5. In an assembly wherein an internal movable part is located between an inner inaccessible member on the accessible outer side of said movable part, said movable part having a plurality of apertures, each disposed therein in a direction between the portions of said inner inaccessible member and said outer wall member that are adjacent to each of said apertures; a plurality of screws, each threaded into said inner inaccessible member with the head of each of said screws being adjacent to one of said apertures and being engageable through said aperture; and a plurality of hollow outer screws threaded through said outer wall member, each of said screws contacting the outer side of said movable part against and in communication with one of said apertures.

6. The assembly of claim 5 wherein the internal movable part and both the inner inaccessible member and the outer wall member are circular in configuration.

References Cited in the file of this patent

UNITED STATES PATENTS

| | | |
|---|---|---|
| 2,154,080 | Zimmerman | Apr. 11, 1939 |
| 2,530,294 | Evers | Nov. 14, 1950 |
| 2,624,537 | Romy | Jan. 6, 1953 |